United States Patent [19]

Sharak et al.

[11] Patent Number: 5,574,076

[45] Date of Patent: Nov. 12, 1996

[54] SUCROSE BENZOATE AS A TACKIFIER FOR WATER SENSITIVE OR BIODEGRADABLE HOT MELT ADHESIVES

[75] Inventors: Matthew L. Sharak, Franklin Park; Charles W. Paul, Madison, both of N.J.

[73] Assignee: National Starch and Chemical Investment Holding Corporation, Wilmington, Del.

[21] Appl. No.: 433,285

[22] Filed: May 3, 1995

[51] Int. Cl.$^6$ .............................. C08K 5/12; C08K 5/521; C08L 91/06; C08L 93/04

[52] U.S. Cl. ........................... 523/128; 524/56; 524/127; 524/270; 524/292; 524/297; 524/230; 524/275; 524/277; 524/377

[58] Field of Search ...................................... 523/124, 128; 524/29, 56, 312, 270, 297, 292, 127, 377, 275, 277, 230

[56] References Cited

U.S. PATENT DOCUMENTS

| | | | |
|---|---|---|---|
| 5,169,889 | 12/1992 | Kauffman et al. | 524/270 |
| 5,171,820 | 12/1992 | Mang et al. | 528/87 |
| 5,217,179 | 6/1993 | Sugiyama | 247/71.1 |
| 5,252,646 | 10/1993 | Iovine et al. | 524/270 |
| 5,356,963 | 10/1994 | Kauffman et al. | 524/43 |
| 5,360,845 | 11/1994 | Billmers et al. | 524/51 |
| 5,387,623 | 2/1995 | Ryan et al. | 523/124 |

FOREIGN PATENT DOCUMENTS

| | | |
|---|---|---|
| 1468736 | 7/1963 | Germany . |
| 1193381 | 8/1989 | Japan . |
| 1207372 | 8/1989 | Japan . |
| 6017018 | 6/1992 | Japan . |
| 6247064 | 2/1993 | Japan . |

OTHER PUBLICATIONS

"Mechanical Properties of Proprietary High Modulus Degradable Polymers–Injection Molded", Dow Chemical Company Technical Literature, Oct. 1994.

"Sucrose Benzoate", Product Information Bulletin, Velsicol Chemical Corporation, Dec. 1, 1978.

"Sucrose Benzoate Alcohol Soluble", Product Information Bulletin, Velsicol Chemical Corporation, Jun., 1991.

*Primary Examiner*—Peter A. Szekely
*Attorney, Agent, or Firm*—Ellen T. Dec

[57] ABSTRACT

Hot melt adhesive compositions are prepared from a water sensitive or biodegradeable thermoplastic adhesive polymer using sucrose benzoate as a tackifier. More particularly, hot melt adhesive compositions are prepared from 10 to 90% by weight of a biodegradable or water sensitive thermoplastic polymer, 5 to 80% by weight sucrose benzoate, 0 to 80% by weight plasticizing diluent, 0 to 50% by weight wax and 0 to 3% by weight antioxidant.

9 Claims, No Drawings

SUCROSE BENZOATE AS A TACKIFIER FOR WATER SENSITIVE OR BIODEGRADABLE HOT MELT ADHESIVES

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs. Depending on the desired use, the degree of tack of the hot melt adhesive may be tailored over a wide range to produce adhesives varying from pressure sensitive to non-pressure sensitive in character. Non-pressure sensitives are used, for example, in bookbinding, bag ending, case and carton sealing. Pressure sensitive hot melts are used in many applications, and particularly in disposables such as diapers, sanitary products and the like, where room temperature tack and long open time are often required.

Hot melt adhesives have historically been based on petroleum derived polymers such as polyethylene, ethylene-vinyl acetate, styreneic block copolymers, and polypropylene to name a few. These compositions are further tackified, plasticized and reinforced with a variety of resins, oils and waxes which are also derived from both petroleum and naturally occurring feedstocks. These classic compositions suffer from the cyclical price cycles common to all oil derived materials, and also are generally very resistant to degradation once the articles employing them are disposed of.

The recent growing movement away from petroleum derived raw materials to those derived from renewable, natural resources has led to the use of new water sensitive, biodegradable and/or compostable polymers as the base polymers in hot melt adhesive compositions. Thus, water sensitive and/or degradable adhesive compositions have been proposed containing such raw materials as hydroxybutyrate/hydroxy-valerate polymers, polylactide homo- or copolymers, hydroxypropyl cellulose, cellulose acetate, starch acetate, hydroxy functional polyesters and the like. While the resultant adhesives may be improved with respect to their water sensitivity and/or degradability, the overall water sensitivity and/or degradability of the adhesive has been retarded by the presence of other additives, such as tackifiers and plasticizers conventionally used in adhesive compositions. In particular, due to the polar nature of the water sensitive or biodegradable polymer, finding a compatible tackifier, but also degradable has been difficult.

There is thus a need for a tackifying material which will not only be degradable in itself but which will also be compatible with a wide range of the above-described adhesive polymer bases.

SUMMARY OF THE INVENTION

We have now found that sucrose benzoate is compatible with and provides adequate tackifying properties to a wide range of biodegradable and/or water sensitive polymers. Thus, the present invention is directed to improved hot melt adhesive compositions comprising a water sensitive or biodegradeable thermoplastic adhesive polymer, and a tackifier, optionally additionally containing a compatible plasticizer, wax and/or stabilizer; the improvement which comprises using sucrose benzoate as the tackifier.

More specifically, the present invention is directed to water sensitive and/or biodegradable hot melt adhesive compositions comprising 10 to 90% by weight of a biodegradable or water sensitive thermoplastic polymer, 5 to 80% by weight sucrose benzoate, 0 to 80% by weight plasticizing diluent, 0 to 50% by weight wax and 0 to 3% by weight antioxidant.

DETAILED DESCRIPTION OF THE PREFERRED EMBODIMENTS

Suitable water sensitive and/or biodegradable thermoplastic polymers for use as the base polymer in the hot melt adhesive compositions include, for example, hydroxybutyrate/hydroxyvalerate polymers, polylactide homo- or copolymers, hydroxypropyl cellulose, hydroxy functional or aliphatic polyesters, starch esters or cellulose esters having a degree of substitution (DS) less than 2.5 and the like.

Useful polymers therefore include homo- or copolymer of polylactide containing at least 20 molar percent of the lactide comonomer. The general structure of the polylactide is shown below:

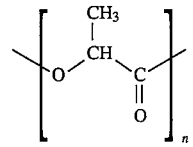

suitable polymers for use herein have a number average molecular weight ($M_n$) within the range of 10,000 to 200,000.

While poly(D,L-lactide) and the meso- are essentially amorphous, poly(L-lactide) or poly(D-lactide) are crystalline in nature and have a crystalline melting point of 186° C. depending on molecular weight and stereopurity. The polymers may be prepared by ring-opening polymerization of the bimolecular cyclic ester of lactic acid with acid or base catalysts such as PbO, $SnCl_2$, $SnCl_4$, $ZnCl_2$, $SbF_5$, $Sb_2O_3$, or triethylamine using solution, precipitation or melt processes. Alternatively, they may be obtained commercially from Henley Chemicals, Inc. under the Resomere tradename; from poly Sciences Inc. or from Ecological Chemical Products Company (Ecochem).

In addition to homopolymers of poly(I-lactide), poly(D, L-lactide), and poly(meso-lactide) suitable polymers for use herein may also be prepared by copolymerization with other lactones such as glycoside or caprolactone. Thus, poly(D, L-lactide-co-glycoside) polymers containing equimolar amounts of the lactide and glycoside components are available from Henley Chemicals as Resomer RG502, 503, 504, 505 and 506 and are suitable for use herein. In addition, poly(D,L-lactide-co-glycoside) polymers known as Resomer RG752, 755 and 756 containing 75% of the lactide component as well as the Resomer 858 polymer which contains 85% lactide are also suitable.

The use of this class of polymer in hot melt adhesives is described in U.S. Pat. Nos. 5,252,646 and 5,312,850 to Iovine et al.

Also useful herein are the linear polyesters of 3-hydroxybutyric (HB) and 3-hydroxyvaleric (HV) acids produced from the fermentation of sugars by the bacterium *Alcaligenes eutrophus*. The general structure is shown below:

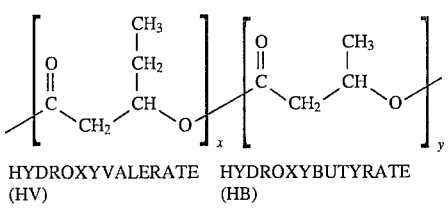

HYDROXYVALERATE (HV)  HYDROXYBUTYRATE (HB)

Polymers suitable for use herein contain 9 to 35% of the hydroxyvalerate component and are available from Zeneca under the Biopol tradename.

The use of these polymers in hot melt adhesive is described in U.S. Pat. No. 5,169,889 to Brady et al.

Also useful are the thermoplastic methylol polyesters containing repeating units of the formula:

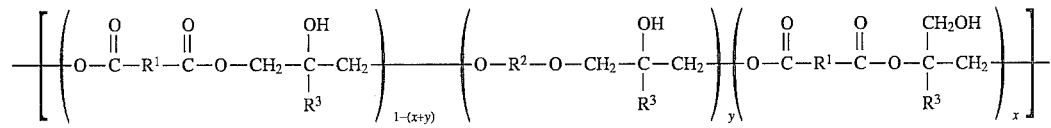

wherein each of $R^1$ and $R^2$ is individually a divalent organic moiety which is predominantly hydrocarbon, each $R^3$ is individually hydrogen or lower alkyl, y is a fraction from 0 to 0.5 and x is a fraction from about 0.05 to about 0.4.

These hydroxy functional polyesters are suitably prepared by contacting one or more diglycidyl ethers or diglycidyl esters with one or more diacids or anhydrides under conditions including the use of an onium catalyst sufficient to cause the acid moieties to react with epoxy moieties to form a polymer backbone having ester linkages and pendant methylol moieties. Depending upon the particular starting materials, the resulting polymer will be crystalline, semi-crystalline or amorphous in nature.

The preparation of these materials are described in greater detail in U.S. Pat. No. 5,171,820 to Mang et al. while their use in hot melt adhesives is described in co-pending application Docket No. 1556, filed on May 3, 1995 herewith.

Aliphatic polyesters are derived from aliphatic diacids and diols. These also vary in crystallinity from amorphous to highly crystalline. They are available from Hüls under the Dynapol tradename.

The use of hydroxypropyl cellulose in hydrophilic hot melt adhesives has been disclosed, for example, in U.S. Pat. No. 5,356,963 issued Oct. 18, 1994. Similarly, cellulose or starch esters, especially cellulose acetate and starch acetate, having a degree of substitution less than 2.5 may also be tackified with sucrose benzoate in accordance with the invention. The use of starch esters in hot melt adhesives has been disclosed in, among others, U.S. Pat. No. 5,360,845 issued Nov. 1, 1994.

Depending on the base polymer, various grades of sucrose benzoate may be employed as the tackifier. For purposes herein, we have found that the alcohol soluble partially esterified grade of sucrose benzoate is the most generally compatible. This grade is a light colored, clear non-crystalline solid with a softening point of about 95° C. For some base polymers, it is also possible to use the non-alcohol organic soluble grade which is substantially fully esterified and is water-clear, non-crystalline flake solid having a softening point of 98° C. As noted, the alcohol soluble grade is more polar than the regular grade because it has more unreacted hydroxyl groups. Both grades are available commercially from Velsicol Chemical Corporation. The amount of sucrose benzoate required will depend upon the other components in the adhesive as well as upon the desired end properties; however, it is usually present in an amount of 5 to 80% by weight, preferably 20 to 60% by weight.

Other components, conventionally utilized in hot melt adhesive compositions may also be used herein. It will be understood that the particular components used will vary depending upon the intended end use of the adhesive as well as the compatibility of the additive with the thermoplastic polymer employed. It will also be recognized that the more water sensitive or biodegradable the additive used, the more degradable will be the resultant adhesive.

Depending on the end-use application, and particularly for uses requiring pressure sensitive properties, various compatible plasticizing or extending oils may also be present in the composition. Preferred compatible plasticizers include phthalate plasticizers such as dioctyl phthalate; liquid polyesters such as Dynacol 720 from Hüls; benzoate plasticizers such as diethylene glycol dibenzoate (e.g., Benzoflex 50 available commercially from Velsicol) and diethylene glycol benzoate where the mole fraction of hydroxyl groups which have been esterified ranges from 0.5 to 0.95 (e.g., Benzoflex 2-45 High Hydroxy from Velsicol); phosphate plasticizer such as t-butylphenyl diphenyl phosphate (e.g., Santicizer 154 available commercially from Monsanto); poly(ethylene glycols) and derivatives thereof such as the phenyl ether of poly(ethylene glycol) (e.g., Pycal 94 available commercially from ICI) as well as liquid rosin derivatives having Ring and Ball melting points below about 60° C. such as the methyl ester of hydrogenated rosin (e.g., Hercolyn D from Hercules); as well as vegetable and animal oils such as glyceryl esters of fatty acids and polymerization products thereof. If used, the plasticizer is generally present in amounts up to about 80% by weight, preferably 10 to 40% by weight.

Other applications conventionally employing adhesives based on these water sensitive or biodegradable polymers may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties. If present, the waxes are used in amounts up to about 50% by weight, preferably 5 to 35% by weight.

Suitable waxes include N-(2-hydroxyethyl)-12-hydroxy stearamide wax, hydrogenated castor oil, oxidized synthetic waxes, poly(ethylene oxide) having a weight average molecular weight above about 1000 and functionalized synthetic waxes such as carbonyl containing Escomer H101 from Exxon.

It should be recognized that some adhesive formulations described herein may contain both wax and plasticizer components so that the presence of one or the other is not mutually exclusive.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxy-benzyl)benzene; pentaerythritol tetrakis-3-(3,5- di-tert-butyl-4-hydroxyphenyl)propionate; n-octadecyl 3,5-di-tert-butyl-4-hydroxyphenyl) propionate; 4,4'-methylenebis(2,6-di-tert-butylphenol); 4,4'-thiobis (6-tert-butyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa[3-(3,5-di-tert-butyl-4-hydroxyphenyl)propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc. There may also be present in the adhesive small amounts (e.g., less than about 20% by weight, and preferably 5 to 20% by weight) of certain thermoplastic and/or hydrophilic polymers as are conventionally used in this class of adhesives to impart flexibility, toughness, strength and/or water sensitivity. Suitable thermoplastic polymers include ethylene vinyl acetate, ethylene acrylic acid, ethylene methyl acrylate and ethylene n-butyl acrylate copolymers containing 12 to 50% vinyl or acrylate monomers. Suitable hydrophilic polymers include polyvinyl alcohol, hydroxyethyl cellulose, hydroxypropyl cellulose, polyvinyl methyl ether, poly(ethylene oxide), polyvinyl pyrrolidone and the like.

These hot melt adhesive compositions may be formulated using techniques known in the art. An exemplary procedure involves placing approximately 40% of the total tackifying resin concentration with all the polymer, wax, plasticizers and stabilizers in a jacketed mixing kettle, preferably in a jacketed heavy duty mixer, which is equipped with rotors and thereupon raising the temperature to a range of from up to about 190° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

The adhesives disclosed herein may be employed in a wide variety of uses as are known in the art. The adhesives described herein may be effectively utilized in a variety of packaging and carton sealing applications. The non-pressure sensitive adhesives may also be used to bind a plurality of sheets in a wide range of bookbinding operations. They may also be used for laminating tissue and/or screen-reinforced tissue layers such as are used in individual or roll use applications as in wipers, paper towels, toilet tissue and other consumer or industrial end uses. When formulated with plasticizers, the resultant adhesives may be used in the assembly or construction of various disposable articles including, but not limited to, sanitary napkins, disposable diapers, hospital gowns, bed pads and the like. In particular, adhesives are useful for the assembly of disposable articles using spray or multi-line construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrate so as, for example, to impart elongation resistant gathers thereto. The adhesive may also be utilized in less demanding disposable construction applications such as for end or perimeter sealing.

In the following illustrative examples all parts are given by weight and all temperatures in degrees Celsius unless otherwise noted.

EXAMPLE I

This example shows the preparation of a hot melt adhesive with completely biodegradable components. Here the base polymer is polylactide, which can be formulated with either the regular or ASG grade of sucrose benzoate.

|  | A | B |
|---|---|---|
| Polylactide | 30 | 30 |
| Sucrose Benzoate (ASG) | 40 |  |
| Sucrose Benzoate Regular |  | 40 |
| Citroflex 2 | 30 | 30 |
| Irganox 1010 | 0.5 | 0.5 |

Citroflex 2: Triethyl citrate from Morflex
Irganox 1010 is a hindered phenol antioxidant The above examples are clear, pressure sensitive with excellent mechanical properties.

EXAMPLE II

This shows how another biodegradable hot melt adhesive can be made based on hydroxybutyrate/valerate (PHV/B), with other biodegradable components. PHV/B is available from Zeneca under the tradename Biopol.

|  | C |
|---|---|
| Biopol | 40 |
| Sucrose Benzoate (ASG) | 40 |
| Surfonic DNP-100 | 20 |
| Irganox 1010 | 0.5 |

Surfonic DNP 100 Dinonyl phenol 10 mole ethylene oxide from Huntsmen

Example C is an opaque non-pressure sensitive hot melt with good compatibility.

EXAMPLE III

This experiment shows how hydroxypropyl cellulose, Klucel, available from Aqualon in varying molecular weight ranges can be made into a water sensitive/dispersable hot melt adhesive with the alcohol soluble grade of sucrose benzoate as the tackifier.

|  | D |
|---|---|
| Klucel L | 15 |
| Sucrose Benzoate (ASG) | 50 |
| Pycal 94 | 20 |
| Hercolyn D | 15 |
| Irganox 1010 | 0.5 |

Pycal 94 is an ethoxylated phenol with approximately 4 moles of ethyleneoxide, available from ICI Specialty Chemicals.
Hercolyn D is the methyl ester of rosin, available from Hercules.

The above example adhesive was clear, water sensitive, with excellent mechanical properties and stability.
Other grades of Klucel, varying in molecular weight as follows may also be used:

| Type | MW* |
|---|---|
| H | 1,150,000 |
| M | 850,000 |
| G | 370,000 |
| J | 140,000 |
| L | 95,000 |
| E | 80,000 |

*Weight average molecular weight determined by size exclusion chromatograph.

The preferred grades for use herein are E, L and J.

EXAMPLE IV

This shows how a water sensitive and biodegradable polymer, starch acetate can be made into a hot melt adhesive with the alcohol soluble grade of sucrose benzoate. In this sample, the viscosity was measured using a Brookfield viscometer (Spindle 27) at various temperatures as noted.

|  | E |
| --- | --- |
| Starch Acetate, DS = 1.6[a] | 45 |
| Macol 206EM | 45 |
| Sucrose Benzoate (ASG) | 10 |
| Santovar A | 0.5 |
| TNPP | 0.5 |
| Viscosity (cp) | |
| 250° F. | 5,238 |
| 275° F. | 2,670 |
| 300° F. | 1,635 |
| 325° F. | 1,195 |
| 350° F. | 845 |

Macol 206EM 6 mole ethoxylate of Bisphenol A from PPG
Santovar A is a hindered phenol available from Monsanto
[a]D.S. - degree of substitution per glucose repeat unit, with 3 being full acetylation

EXAMPLE V

In the following example various grades of methylol poly(ether, esters) available from Dow Chemical were evaluated with the alcohol soluble grade of sucrose benzoate. In preparing the following samples, a heavy duty mixer which had been heated to 165° C. and which was equipped with a stirring paddle was charged with 40% of the tackifying resin and/or diluent. After melting of the resins, stirring was then initiated whereupon the polyester was added slowly at 165° C. over a one-half hour period after which the temperature was lowered to 150° C. Heating and stirring were continued until a homogeneous mass was obtained whereupon the remainder of the tackifying resin and/or diluent was admixed therewith.

The samples were tested using the following procedures:

Viscosity measurements were determined after 30 minutes using a Brookfield viscometer (Spindle 27) at 250° F.

The adhesive was also subjected to Peel/Shear testing such as is conventionally required in the packaging industry. Peel Temperature Test: A bead of test adhesive approximately ⅛ inch in diameter is applied at 325° F. to 350° F. with a glass rod onto 60 pound/ream kraft paper. A second sheet of the same paper is superimposed on the first sheet within 2 seconds and pressed thereto to form a kraft-to-kraft bond. The bonded sheets are then cut perpendicular to the adhesive line into 1 inch wide strips. Duplicate bonded specimens are placed in an oven with one free end of the specimen attached to a fixed support and a 100 gram load suspended from the other sheet at the same end of the bond. The oven temperature is then increased in 10° F. increments at 15 minute intervals. The temperature at which bond delamination occurred is specified as the peel temperature.

Shear Temperature Test: Samples are prepared as in peel temperature test but separate sheets of Kraft at opposite ends of the bonded specimen are suspended and weighted to stress the bond in a shear mode. The temperature of the oven is increased as in peel test until failure occurs.

Adhesion Test: A molten bead of hot melt at 325° F. to 350° F. was drawn across the middle (widthwise) of a 1"×3" strip of corrugated paper. A second strip of corrugated paper was then immediately superimposed upon the first and a 50 gram weight placed on top of the construction. The kraft-to-kraft bonds were then aged 24 hours at room temperature. After aging, the samples were stressed by hand at the temperature noted (0° F., 20° F. or 40° F.) in a 90° peel mode. The presence of fiber tear indicates excellent adhesion.

Tack and Range were measured by drawing out a 3 mil thick adhesive film and qualitatively measuring the tack by determining how many successive finger prints could be made in the film before it set. The range or open time indicates the number of seconds during which the finger prints can be made. Cigarette plug adhesion was measured by applying a bead of adhesive to cigarette plug paper, forming a bond and conditioning the bond for 24 hours at room temperature. After conditioning, the bonds were pulled at 180° mode by hand.

Some of the adhesives were also tested for thermal stability by storing at 275° F. for 24 hours and then noting the appearance of the adhesive.

Samples J and K are typical formulations used in non-pressure sensitive packaging case and carton seal type application. In these samples, the crystalline poly(ether, ester) formed from the reaction of hydroquinone diglycidyl ether with 1,10-decandicarboxylic acid was employed (CRY). These formulations have low viscosity and good high temperature performance as can be seen from the good peel/shear values. Also, the products have good low temperature performance as is demonstrated by the good adhesion to corrugated at low temperatures. Lastly, these products have excellent adhesion to cigarette plug wrap.

|  | F | G |
| --- | --- | --- |
| CRY | 50 | 50 |
| Sucrose Benzoate ASG |  | 20 |
| Benzoflex 2-45 High Hydroxyl | 30 | 10 |
| Paracin 220 | 20 | 20 |
| Irganox 1010 | 0.5 | 0.5 |
| Viscosity (cp) @ 250° F. | 5,612 | 10,920 |
| Peel (F) | 100 | 110 |
| Shear (F) | 180 | 180 |
| Tack | Slightly Aggressive | Aggressive |
| Range | 3 seconds | 4 seconds |
| Corrugated Adhesion |  |  |
| 0° F. | 50% | 80% |
| 20° F. | 70% | 85% |
| 40° F. | 70% | 85% |
| Cigarette Plug Wrap Adhesion | Excellent | Excellent |

Benzoflex 2-45 High Hydroxyl - diethylene glycol benzoate where about 0.75 mole fraction of hydroxyl groups have been esterified to benzoate esters from Velsicol Chemical Corporation.

The test results presented above show the adhesives to be particularly suitable for packaging applications such as case and carton sealing due to its low viscosity, good fiber tear and acceptable peel and shear values.

Another series of hot melt adhesives were formulated into pressure sensitive formulations using an essentially amorphous poly(ether, ester) derived from the reaction of bisphenol A diglycidyl ether and 1,4-cyclohexanedicarboxylic acid (AMP).

The compositions and test results are shown in the tables which follow:

|  | H |
| --- | --- |
| AMP | 25 |
| Sucrose Benzoate ASG | 40 |
| Benzoflex 2-45 High Hydroxyl | 35 |
| Irganox 1010 | 0.5 |
| Comments | Good compatibility |
| Viscosity (cp) |  |
| @ 275° F. | 4115 |
| @ 300° F. | 2250 |

The resultant adhesive was evaluated and found to give a clear water white product. Poly/non-woven bonds were made by heating the adhesive to approximately 135° C. and applying a thin bead of adhesive onto the polyethylene and quickly mating the non-woven and next applying compression with a 200 g weight or rolling over the bond with a 5 lb. roller. The bonds were then pulled by hand and gave deformation of the substrate which indicated good penetration and good adhesion properties.

In the following formulations several waxes were used in the adhesive formulations in conjunction with the poly-(ether, ester) and the sucrose benzoate.

|  | I | J | K | L |
| --- | --- | --- | --- | --- |
| AMP. | 20 | 20 | 20 | 20 |
| Sucrose Benzoate (ASG) | 40 | 40 | 40 | 40 |
| Castor Wax | 10 |  |  |  |
| Kemamide W-40 |  | 15 |  |  |
| Paracin 220 |  |  | 15 | 15 |
| Benzoflex 50 |  |  |  | 25 |
| Benzoflex 2-45 High Hydroxyl | 30 | 25 | 25 |  |
| Irganox 1010 | 0.5 | 0.5 | 0.5 | 0.5 |
| Comments | Compatible | Compatible | Compatible | Compatible |
| Viscosity (cp) |  |  |  |  |
| @ 250° F. |  |  | 2,485 | Not tested |
| @ 275° F. | 1,340 | 4,100 | 1,290 |  |
| @ 300° F. | 735 | 1,420 | 715 |  |
| Corrugated Adhesion |  |  |  |  |
| 0° F. | 10% | Not tested | 0% | 0% |
| 20° F. | 20% |  | 0 | 0 |
| 40° F. | 95% |  | 10 | 10 |
| Peel (°F.) | 100 |  | 130 | 140 |
| Shear (°F.) | 100 |  | 170 | 170 |
| Tack | Aggressive | Very Aggressive | Very Agressive | Very Agressive |
| Range (seconds) | 8 | 1 | 5 | 2 |

Castor Wax, Cas Chem: Hydrogenated castor oil
Kemamide W40, Witco: N,N'-ethylenebisstearamide As the results indicate, all of the waxes evaluated were compatible in the formulations. In Samples I, J, K and L the low temperature performance was not within acceptable levels; however, the high temperature performance was within acceptable levels suitable for pressure sensitive type applications, such as in the construction of disposable articles where low temperature performance is not critical.

We claim:

1. A hot melt adhesive composition comprising 10 to 90% by weight of a water sensitive or biodegradeable thermoplastic adhesive polymer selected from the group consisting of hydroxybutyrate/hydroxyvalerate polymers, polylactide homo- or copolymers, hydroxypropyl cellulose, cellulose or starch esters having a degree of substitution less than 2.5 and hydroxy functional or aliphatic polyesters; 5 to 80% by weight sucrose benzoate, 0 to 80% by weight of a plasticizing diluent selected from the group consisting of phthalate plasticizers, liquid plasticizers, benzoate plasticizers, phosphate plasticizers, poly(ethylene glycols) methyl esters of hydrogenated rosins having Ring and Ball melting points below about 60° C., vegetable and animal oils and the polymerization products thereof; 0 to 50% by weight of a wax selected from the group consisting of N-(2-hydroxyethyl)-12-hydroxy stearamide, hydrogenated castor oil, oxidized synthetic waxes, polyethylene oxide) having a weight average molecular weight above about 1000 and functionalized synthetic waxes, and 0 to 3% by weight antioxidant.

2. The hot melt adhesive of claim 1 wherein the water sensitive or biodegradable polymer is a homo- or copolymer of polylactide containing at least 20 molar percent of the lactide comonomer.

3. The hot melt adhesive of claim 1 wherein the water sensitive or biodegradable polymer is a linear polyester of 3-hydroxybutyric and 3-hydroxyvaleric acid.

4. The hot melt adhesive of claim 1 wherein the water sensitive or biodegradable polymer is a thermoplastic methylol polyester prepared by the reaction of one or more diglycidyl ethers or diglycidyl esters with one or more diacids or anhydrides.

5. The hot melt adhesive of claim 1 wherein the water sensitive or biodegradable polymer is hydroxypropyl cellulose.

6. The hot melt adhesive of claim 1 wherein the water sensitive or biodegradable polymer is starch acetate having a degree of substitution less than 2.5.

7. The hot melt adhesive of claim 1 wherein the water sensitive or biodegradable polymer is an aliphatic polyester.

8. The hot melt adhesive of claim 1 wherein the sucrose benzoate is present in an amount of 10 to 40% by weight.

9. The hot melt adhesive of claim 1 wherein the sucrose benzoate is partially esterified.

\* \* \* \* \*